United States Patent
Kanda et al.

[11] Patent Number: 6,141,396
[45] Date of Patent: Oct. 31, 2000

[54] INITIAL LOADING CORE

[75] Inventors: Akiko Kanda, Hitachi; Katsumasa Haikawa, Jyuo-machi; Akihiro Yamanaka, Hitachi; Kenmi Narita, Hitachi; Junichi Yamashita, Hitachi; Junichi Koyama, Hitachi, all of Japan

[73] Assignee: Hitachi, Ltd., Tokyo, Japan

[21] Appl. No.: 09/254,183

[22] PCT Filed: Sep. 4, 1996

[86] PCT No.: PCT/JP96/02501

§ 371 Date: Mar. 2, 1999

§ 102(e) Date: Mar. 2, 1999

[87] PCT Pub. No.: WO98/10426

PCT Pub. Date: Mar. 12, 1998

[51] Int. Cl.[7] .................................................. G21C 3/326
[52] U.S. Cl. .......................... 376/267; 376/419; 376/428; 376/435
[58] Field of Search ................................... 376/267, 419, 376/428, 435, 447

[56] References Cited

U.S. PATENT DOCUMENTS

| | | | |
|---|---|---|---|
| 5,202,085 | 4/1993 | Aoyama et al. | 176/435 |
| 5,544,211 | 8/1996 | Haikawa et al. | 376/435 |
| 5,631,939 | 5/1997 | Haraguchi et al. | 376/349 |
| 5,781,604 | 7/1998 | Haikawa et al. | 376/419 |
| 5,787,139 | 7/1998 | Nakamura et al. | 376/267 |
| 6,005,905 | 12/1999 | Yamanaka et al. | 376/267 |

*Primary Examiner*—Michael J. Carone
*Assistant Examiner*—K. Kevin Mun
*Attorney, Agent, or Firm*—Antonelli, Terry, Stout & Kraus, LLP

[57] ABSTRACT

Several unit loading patterns are arranged in the central area of an initial core to which the present invention is applied. The unit loading pattern is composed of one square-shaped unit cell and four cross-shaped control rods 3 which surround the unit cell. The unit cell is composed of one low enrichment fuel assembly 7, two high enrichment fuel assemblies 8 and one high enrichment fuel assembly 9. The low enrichment fuel assemblies 7 of each unit loading pattern adjoin each other and are arranged to constitute the first control cell 2*a* being square-shaped. The high enrichment fuel assemblies 9, obliquely adjoining the low enrichment fuel assembly 7 in each unit loading pattern, adjoin each other and are arranged to constitute the second control cell 2*b* being square-shaped. The high enrichment fuel assembly 9 constituting the unit loading pattern is divided into a control rod side area and an anticontrol rod side area by a diagonal line L1, and the number of Gd fuel rods in the control rod side area is 2 or more than the number in the anticontrol rod side area. By providing this structure, the increase of the local peaking factor on the control rod side can be suppressed and the thermal margin can be sufficiently secured, even if the control rod 3 of the second control cell 2*b* is extracted after the second operation cycle.

9 Claims, 17 Drawing Sheets

| | | |
|---|---|---|
|  | FIRST CONTROL CELL | 29 |
|  | SECOND CONTROL CELL | 32 |
|  | LOW ENRICHMENT FUEL | 208 |
|  | HIGH ENRICHMENT FUEL | 304 |
|  | HIGH ENRICHMENT FUEL | 360 |

FIG.7

| 1.3 | 1.2 | 1.2 | 1.2 | 1.2 | 1.2 | 1.2 | 1.1 | 0.9 |
|-----|-----|-----|-----|-----|-----|-----|-----|-----|
| 1.2 | 1.0 | 1.0 | 1.0 | 1.0 | 1.0 | 1.0 | 1.1 | 1.0 |
| 1.2 | 1.0 | 0.8 | 0.9 | 1.0 | 1.0 | 0.8 | 1.0 | 1.1 |
| 1.2 | 1.0 | 0.9 | 1.0 |     |     | 0.9 | 0.8 | 1.0 |
| 1.2 | 1.0 | 1.0 |     |     |     | 0.8 | 0.9 | 1.0 |
| 1.2 | 1.0 | 1.0 |     |     | 0.9 | 0.9 | 0.8 | 1.0 |
| 1.2 | 1.0 | 0.8 | 0.9 | 0.8 | 0.9 | 0.8 | 0.9 | 1.1 |
| 1.1 | 1.1 | 1.0 | 0.8 | 0.9 | 0.8 | 0.9 | 1.0 | 1.0 |
| 0.9 | 1.0 | 1.1 | 1.0 | 1.0 | 1.0 | 1.1 | 1.0 | 0.9 |

| | | |
|---|---|---|
|  | FIRST CONTROL CELL | 29 |
|  | SECOND CONTROL CELL | 32 |
|  | LOW ENRICHMENT FUEL | 208 |
|  | HIGH ENRICHMENT FUEL | 172 |
|  | HIGH ENRICHMENT FUEL | 360 |
|  | MIDDLE ENRICHMENT FUEL | 132 |

6,141,396

1

INITIAL LOADING CORE

BACKGROUND OF THE INVENTION

The present invention relates to an initial core of a boiling water reactor (BWR).

It is necessary to increase the average enrichment of an initial core to raise the discharge exposure of the initial core. Therefore, in an initial core, which is loaded with a plurality of fuel assemblies having a different average enrichment, the difference in the nuclear characteristics between a high enrichment fuel assembly having a high average enrichment and a low enrichment fuel assembly having a low average enrichment becomes large.

In case a high enrichment fuel assembly and a low enrichment fuel assembly adjoin each other, a thermal neutron is caused to flow from the low enrichment fuel assembly with a high thermal neutron flux to the high enrichment fuel with a low thermal neutron flux. Therefore, because the output of the fuel rods of the high enrichment fuel assembly increases, and the MLHGR (Maximum Linear Power Heat Generation Ratio) and the MCPR (Minimum Critical Power Ratio) in the beginning of burnup become severe, an improvement in the thermal margin becomes a problem.

To improve the thermal margin, fuel rods containing gadolinia (hereinafter called a "Gd fuel rod") are arranged symmetrically in the cross section of a conventional fuel assembly. In case the average enrichment of an initial core is heightened for high burnup, control rods are inserted in the core for a long time, and then they are extracted to suppress excess reactivity.

Therefore, the output of one side near to the control rod is smaller than that of the other side far from the control rod in the cross section of a fuel assembly loaded into a control cell. Burnup of fuel rods on the one side near to the control rod is delayed. This is called control rod history effect. Due to the influence of this control rod history effect, the thermal margin could not be sufficiently secured in a conventional initial core. Particularly, in a case where the high enrichment fuel was loaded into the control cell in a second operation cycle, the thermal margin was severe.

SUMMARY OF THE INVENTION

It is an object of the present invention to secure the thermal margin in an initial core that increases the average enrichment for a high burnup and uses a high enrichment fuel assembly for the control cell in the second operation cycle.

In accordance with the present invention, to achieve the above object, there is provided an initial core comprising a plurality of fuel assemblies having different average enrichment and a plurality of control rods, each fuel assembly having a square-shaped cross section and each control rod having a cross-shaped cross section, wherein a unit cell of a square-form is composed of one first fuel assembly with the lowest average enrichment and three second fuel assemblies with higher average enrichment than the first fuel assembly. A plurality of unit loading patterns are arranged in a central area of the initial core, each unit loading pattern being composed of one unit cell and four control rods arranged at four corners of said one unit cell, and the second fuel assembly obliquely adjoining the first fuel assembly in each unit loading pattern is divided into one side area near to the control rod and the other side area far from the control rod by a diagonal line, the number of fuel rods containing gadolinia in said one side area being 2 or more than the number in said other side area.

To examine an effect according to the present invention, the local peaking factor of the high enrichment fuel assembly that composes the control cell in the second operation cycle was analytically analyzed.

FIG. 5 shows a unit loading pattern of a comparative example. This comparative example includes one low enrichment fuel assembly 7, two high enrichment fuel assemblies 8 and one high enrichment fuel assembly 9a like that of FIG. 2 to be mentioned later. Low enrichment fuel assembly 7 is equivalent to the first fuel assembly and high enrichment fuel assemblies 8 and 9a are equivalent to the second fuel assemblies. In FIG. 5, high enrichment fuel assembly 9a is divided into a control rod side area and an anticontrol rod side area by a diagonal line L1. The number of Gd fuel rods 10 in the control rod side area is 4 and the number of Gd fuel rods 10 in the anticontrol rod side area is 10.

By use of the comparative example of FIG. 5, the local peaking factor in a cross section perpendicular to an axial direction of the high enrichment fuel assembly 9a in exposure of 20 GWd/t was analyzed for two 2 cases. The first case is a first comparative example wherein control rod 3 is not inserted in a core until an exposure of 20 GWd/t (equivalent to end of the second operation cycle) is reached. The second case is a second comparative example wherein control rod 3 is not inserted in the core until the exposure of 10 GWd/t (equivalent to end of the first operation cycle) is reached, then the control rod 3 is inserted in the core until the exposure of 20 GWd/t is reached, and finally the control rod 3 is extracted from the core when the exposure of 20 GWd/t has been reached.

Analytical results of the first comparative example are shown in FIG. 6 and analytical results of the second comparative example are shown in FIG. 7. The above-mentioned cross section perpendicular to the axial direction is a cross section of 2/24–10/24 from the lower end of fuel active length of the fuel assembly. As shown in FIG. 6 and FIG. 7, the local peaking factor on the control rod side of the second comparative example becomes larger than that of the first comparative example due to the influence of the control rod history effect. As shown in FIG. 7, the local peaking factor of a corner on the control rod side becomes maximum.

Next, FIG. 8 shows analytical results of the local peaking factor in the cross section perpendicular to the axial direction of the present invention shown in FIG. 2 to be mentioned later at the exposure of 20 GWd/t, when the control rod of the present invention shown in FIG. 2 is operated in the same way as the second comparative example. High enrichment fuel assembly 9 of FIG. 2 is divided into a control rod side area and an anticontrol rod side area by the diagonal line L1, the number of the Gd fuel rods 10 in the control rod side area is 10 and the number of the Gd fuel rods 10 in the anticontrol rod side area is 4. The difference in the number of the Gd fuel rods (hereinafter called "Gd fuel rod difference") between these two areas is 6. The distribution of Gd fuel rods 10 in FIG. 2 is reversed relative to that in the comparative example of FIG. 5.

From FIG. 8, it is seen that an increase in the local peaking factor on the control rod side in accordance with the present invention can be suppressed relative to that in the second comparative example. That is, by arranging a greater number of Gd fuel rods 10 on the control rod side as compared to the anticontrol rod side in the high enrichment fuel assembly 9, when the control rod 3 is extracted from a control cell composed of the high enrichment fuel assembly 9 after the second operation cycle, the increase of the local peaking factor on the control rod side can be suppressed and the thermal margin can be secured. Especially, it is effective to arrange a Gd fuel rod 10 in the corner of the second layer from the outside on the control rod side of the high enrichment fuel assembly 9 in order to suppress the local peaking factor at the corner on the control rod side which becomes maximum.

Next, the relation between the Gd fuel rod difference and the above mentioned suppression effect of the local peaking factor will be explained with reference to FIG. 17.

FIG. 17 shows the Gd fuel rod difference, which is defined as the difference (n1–n2) between the number n1 of the Gd fuel rods 10 in the control rod side area and the number n2 of the Gd fuel rods 10 in the anticontrol rod side area, along the horizontal axis, versus the maximum value of fuel rod output along the vertical axis, when the position of the Gd fuel rods 10 in the high enrichment fuel assembly 9 is changed. In case a Gd fuel rod exists on the diagonal line L1, 0.5 is added to the number of Gd fuel rods in the control rod side area and the anticontrol rod side area, respectively.

As shown in FIG. 17, the maximum value of fuel rod output tends to begin to decrease from a value of the Gd fuel rod difference of about 1 and becomes almost saturated at a value of the Gd fuel rod difference over 3. From this tendency, it is established that the maximum value of fuel rod output can be effectively reduced by making the Gd fuel rod difference 2 or more. Therefore, an increase in the local peaking factor on the control rod side can be suppressed and the thermal margin can be secured by making the Gd fuel rod difference 2 or more. Furthermore, the more desirable range of Gd fuel rod difference is 3 or more in which the above mentioned saturation tendency appears.

FIG. 17 does not show an upper limit of the Gd fuel rod difference. But, there is an upper limit of the Gd fuel rod difference and this upper limit is about ¼ of the number of all fuel rods in the fuel assembly. This upper limit is determined by the following factors. The Gd fuel rod is arranged at a position excluding outermost positions of the fuel assembly. Therefore, it is impossible to arrange a larger number of Gd fuel rods in the control rod side area than the fuel assembly shown in FIG. 18. In case of FIG. 18, the Gd fuel rod difference is 19 and is about ¼ of 74 which is the number of all fuel rods.

BRIEF DESCRIPTION OF THE DRAWINGS

FIG. 7 is a diagram showing an analytical result of local peaking factor of a second comparative example.

PREFERRED EMBODIMENT OF THE PRESENT INVENTION

Various embodiments of the present invention now will be described with reference to the drawings.

Figure 1:
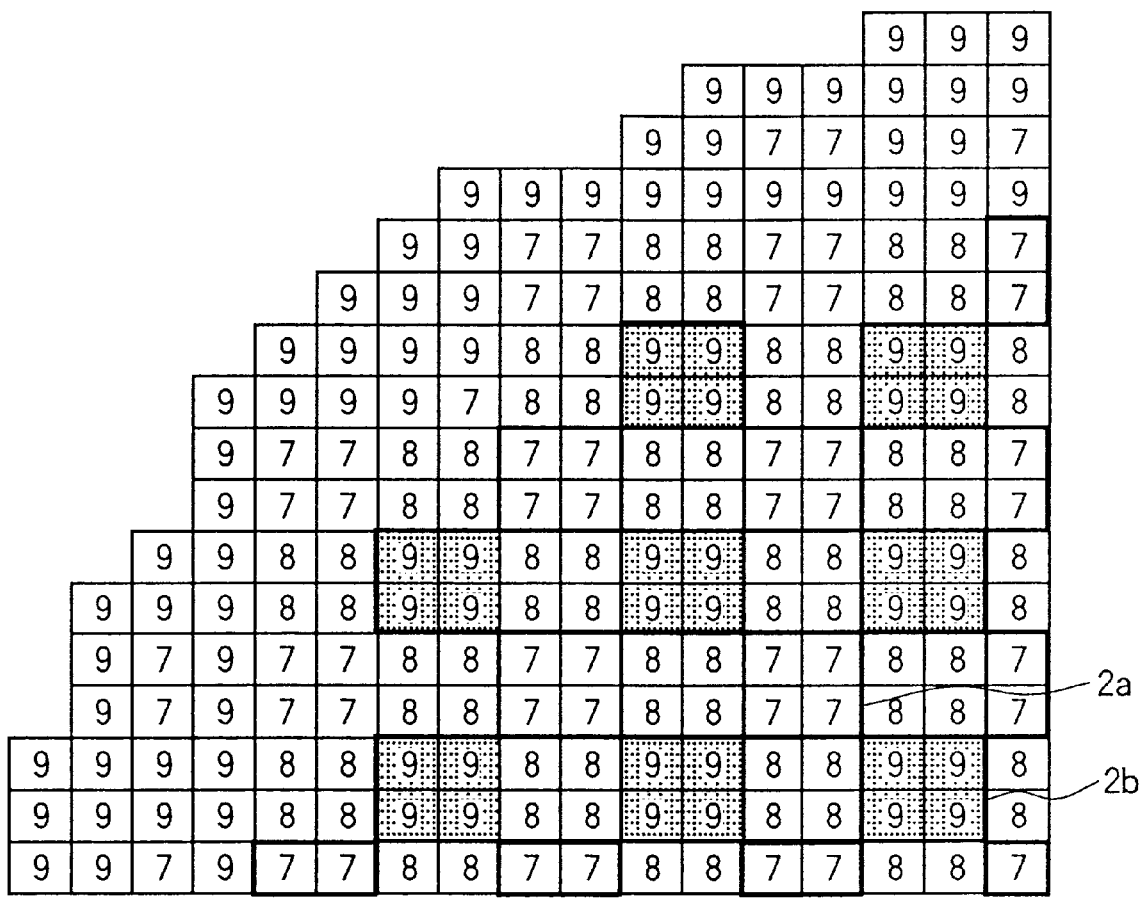
FIG. 1 is a cross sectional diagram showing one-fourth of a first example of an initial core according to the present invention.
Figure 1:
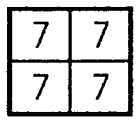
Figure 1:
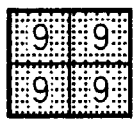
Figure 1:
Figure 1:
Figure 1:

FIG. 1 is a cross sectional diagram showing one-fourth of a first example of an initial core according to the present invention. This core is composed of 872 fuel assemblies, which include 208 low enrichment fuel assemblies 7, 304 high enrichment fuel assemblies 8 and 360 high enrichment fuel assemblies 9. An average enrichment of the low enrichment fuel assemblies 7 is lower than that of the high enrichment fuel assemblies 8. The average enrichment of the high enrichment fuel assemblies 8 and 9 is equal.

Figure 2:
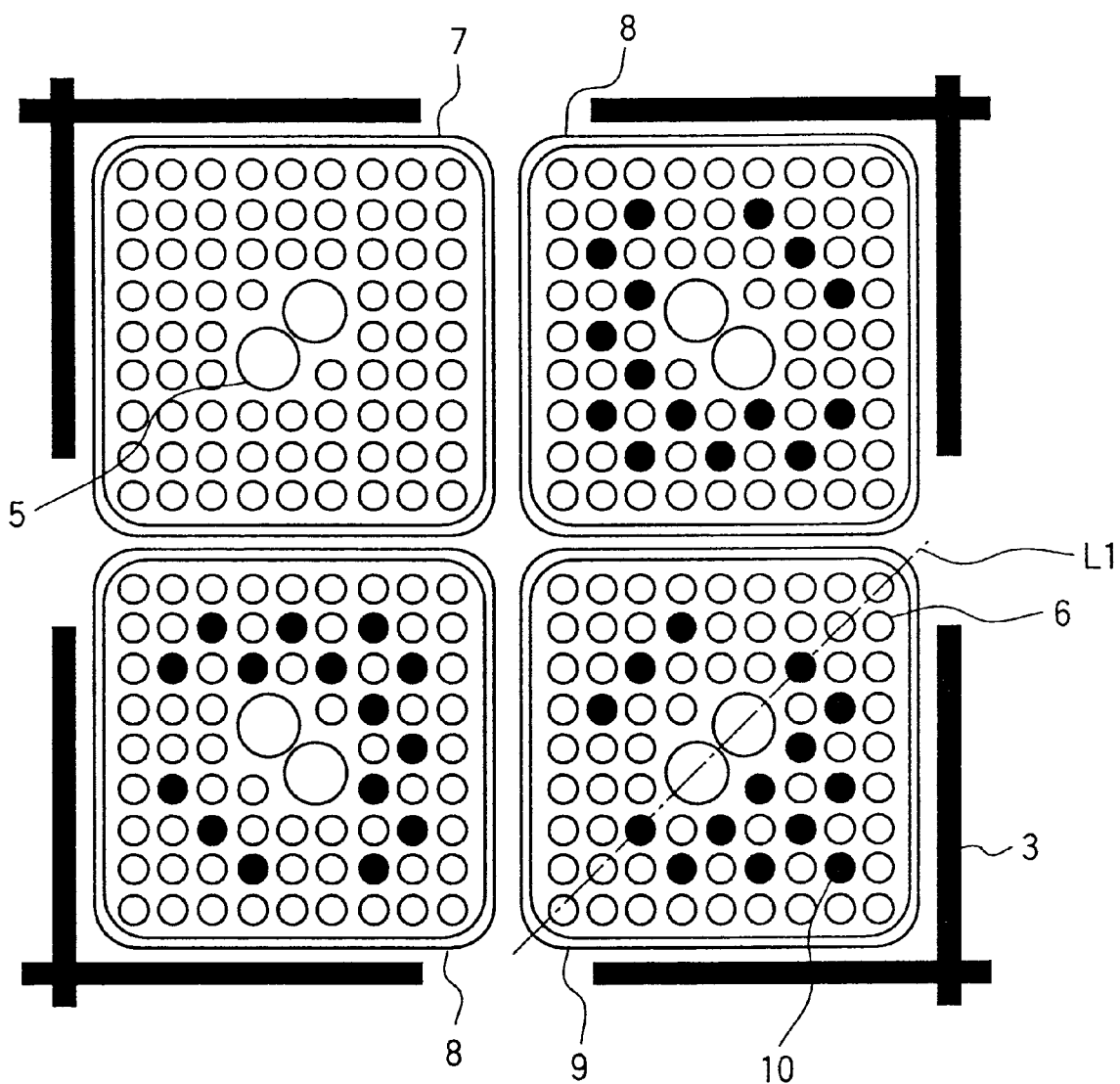
FIG. 2 is a cross sectional view of the first example of a unit loading pattern according to the present invention.

Several unit loading patterns, as shown in FIG. 2, are arranged in a central area, which is an inner area beginning at the second layer from the outermost periphery of the core. FIG. 2 shows a cross sectional view of the first example of a unit loading pattern according to the present invention. This unit loading pattern is composed of one square-shaped unit cell and four cross-shaped control rods 3 which surround the unit cell. The unit cell is composed of one low enrichment fuel assembly 7, two high enrichment fuel assemblies 8 and one high enrichment fuel assembly 9. In the core of FIG. 1, 128 unit loading patterns are loaded.

In the central area of the core, the low enrichment fuel assembly 7 of each unit loading pattern adjoins each other fuel assembly thereof and is arranged to constitute the first control cell 2a of square-shape. The high enrichment fuel assembly 9, obliquely adjoining the low enrichment fuel assembly 7 in each unit loading pattern, adjoins each other fuel assembly therein and is arranged to constitute the second control cell 2b of square-shape. That is, four unit loading patterns, each of which include a first control cell 2a and a second control cell 2b symmetrically arranged relative to the center of the first control cell 2a and the second control cell 2b, respectively, are provided.

The core of FIG. 1 has 29 first control cells 2a and 32 second control cells 2b. The control rod 3 is inserted in the first control cell 2a in the first operation cycle and inserted in the second control cell 2b mainly in the second operation cycle.

Each fuel assembly constituting a unit loading pattern has fuel rods 6 arranged in a square-form of 9 columns and 9 rows (9×9) and two large-diameter water rods 5 in which water flows. Two water rods 5 are arranged in an area in which seven fuel rods can be arranged.

Figure 4:
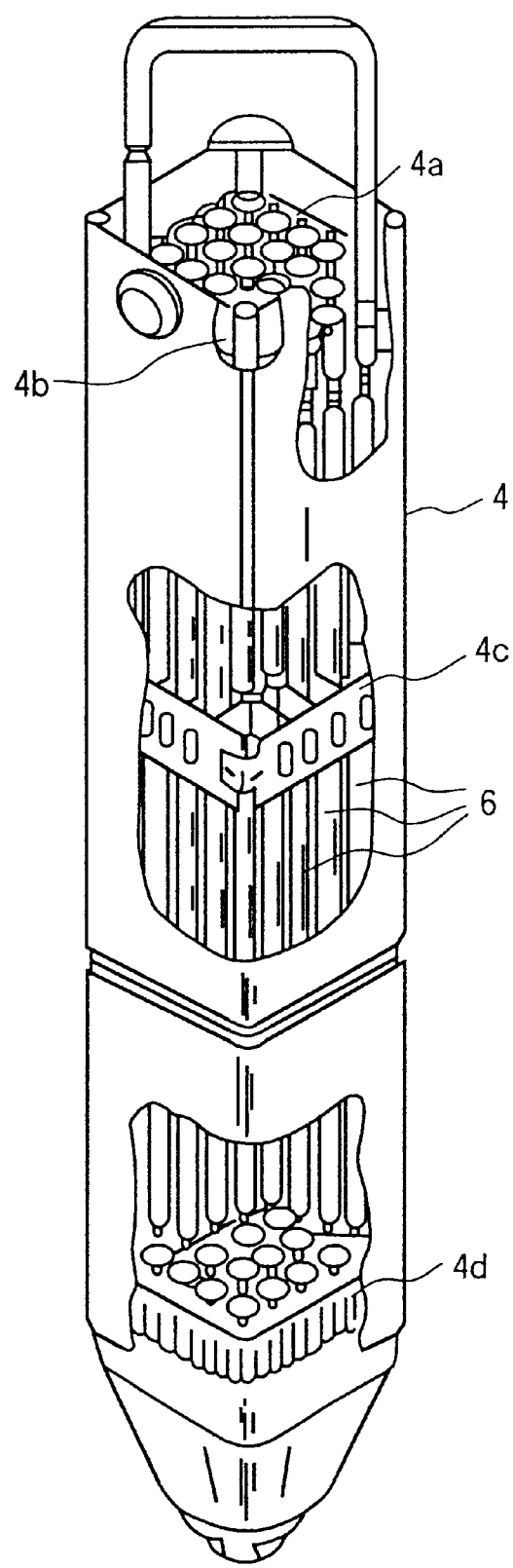
FIG. 4 is a partially broken-away perspective view of a fuel assembly according to the present invention.
Figure 5:
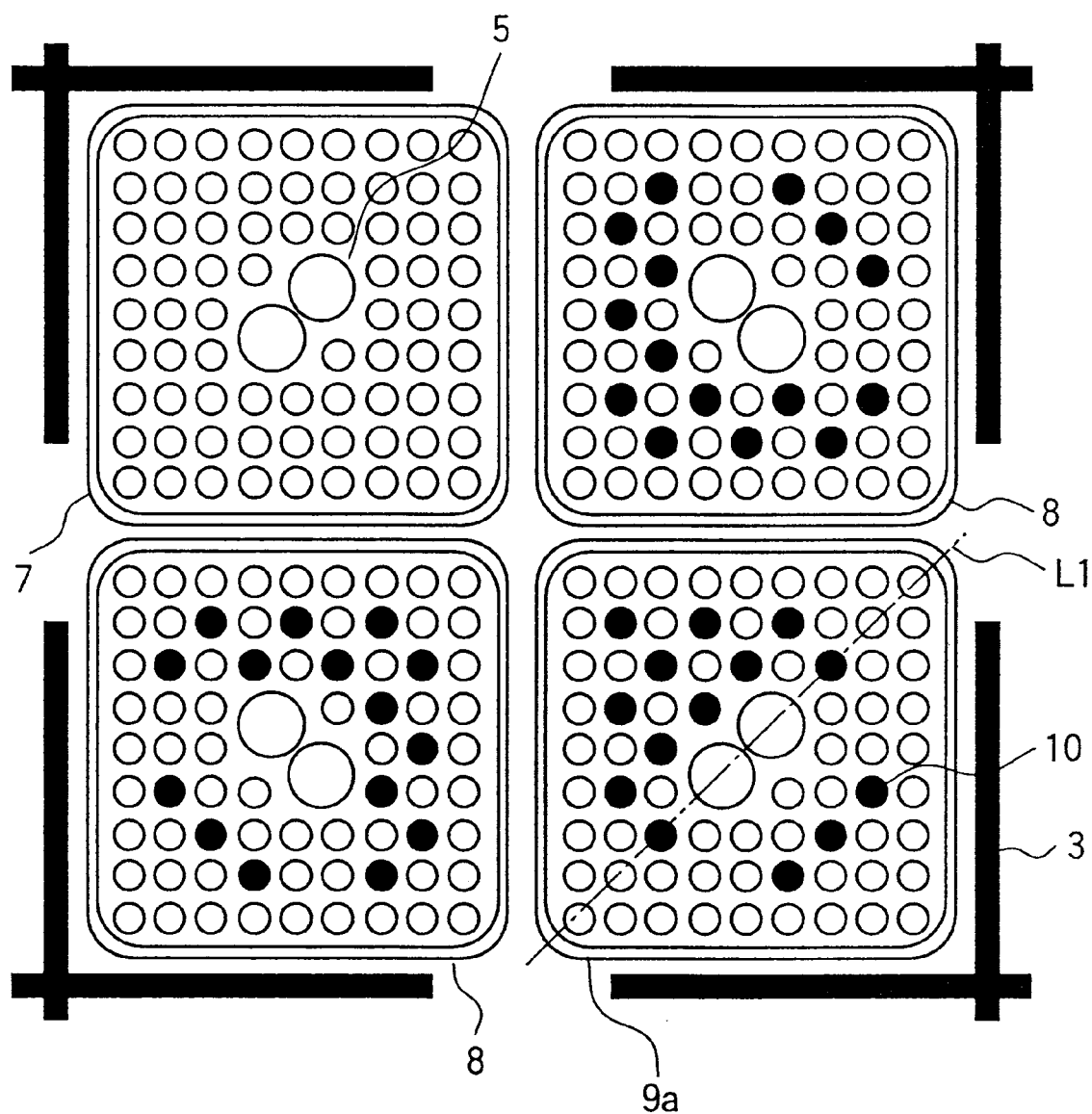
FIG. 5 is a cross sectional view of the unit loading pattern of a comparative example.
Figure 6:
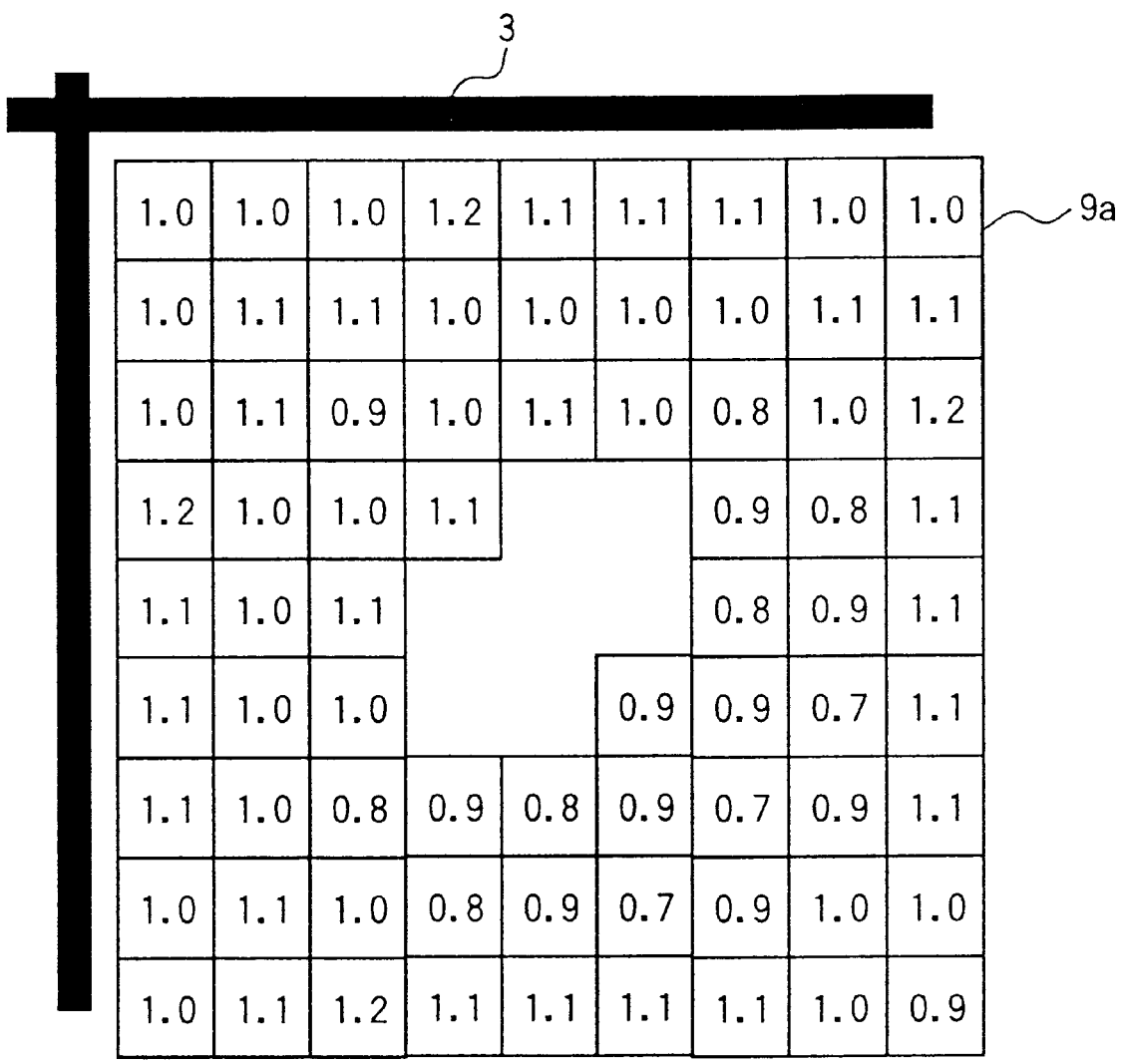
FIG. 6 is a diagram showing an analytical result of local peaking factor of a first comparative example.
Figure 8:
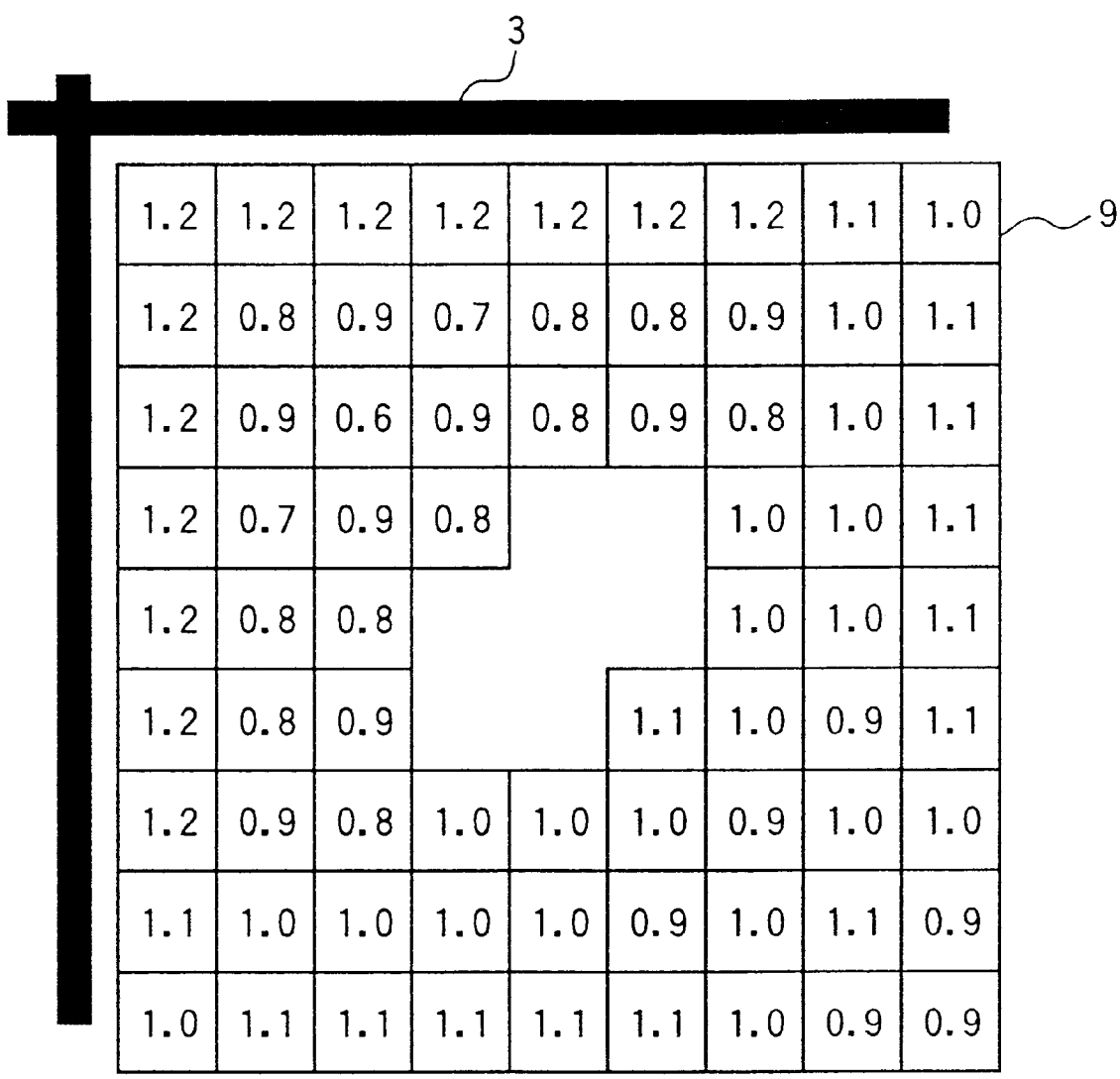
FIG. 8 is a diagram showing an analytical result of local peaking factor according to the present invention.

As shown in a partially broken-away perspective view of FIG. 4, an actual fuel assembly is composed of an upper tie plate 4a, a lower tie plate 4d, a channel fastener 4b, spacers 4c, water rods 5 (not illustrated), fuel rods 6, channel box 4 and so on. The channel fastener 4b installed in a corner of the upper tie plate 4a is a means for fixing the fuel assembly to the control rod 3. Therefore, in the fuel assembly itself, the control rod side area is equivalent to an area on a side where the channel fastener 4b exists.

The number of Gd fuel rods 10 in the high enrichment fuel assembly 9 constituting the unit loading pattern of FIG. 2 is 14. Ten Gd fuel rods 10 are arranged in the control rod side area and four Gd fuel rods 10 are arranged in the anticontrol rod side area. The difference in the number of Gd fuel rods (Gd fuel rod difference) between these two areas is 6. The number of the Gd fuel rods 10 in the high enrichment fuel assembly 8 is 15. Five Gd fuel rods 10 are arranged in the control rod side area and ten Gd fuel rods 10 are arranged in the anticontrol rod side area.

Figure 3:
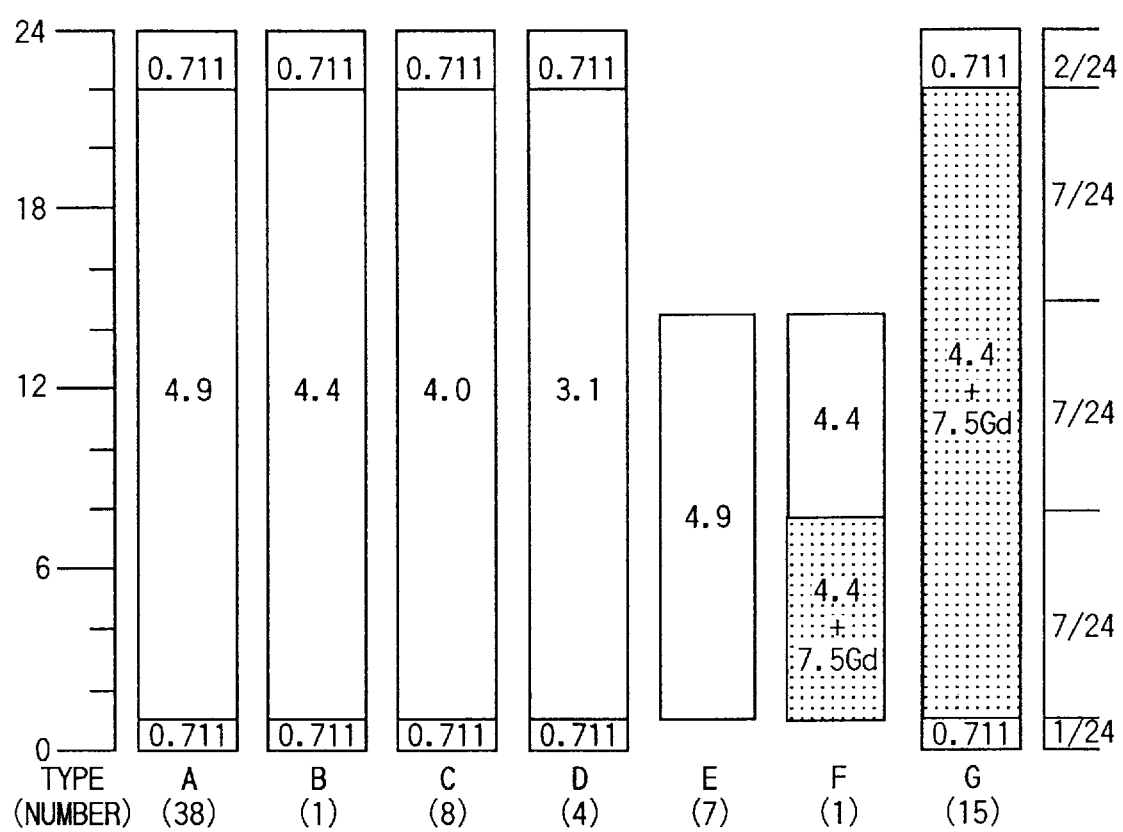
FIG. 3 is a diagram showing the distribution of enrichment and gadolinia in the axial direction of the high enrichment fuel of FIG. 2.

FIG. 3 shows the distribution of the enrichment and gadolinia in the axial direction of the high enrichment fuel assembly 9 of FIG. 2. The high enrichment fuel assembly 9 is composed of fuel rods A–D containing uranium fuel and no gadolinia in the over-all length of a fuel active length, Gd fuel rod G containing uranium fuel in the overall length of the fuel active length and gadolinia in a range of $1/24$–$22/24$ from the lower end of the fuel active length, short-length fuel rod E containing uranium fuel and no gadolinia in a range of $1/24$–$15/24$ from the lower end of the fuel active length, and Gd fuel rod F containing uranium fuel in the range of $1/24$–$15/24$ and gadolinia in a range of $1/24$–$8/24$ from the lower end of the fuel active length. The number of each of the fuel rods provided is as shown in FIG. 3.

The fuel rods A–D and the Gd fuel rod G are loaded with natural uranium (enrichment of 0.711 wt %) in both a lower end region of $0/24$–$1/24$ and an upper end region of $22/24$–$24/24$ from the lower end of the fuel active length. The fuel rods A–D are loaded with uranium fuel of 4.9, 4.4, 4.0 and 3.1 wt %, respectively, in the range of $1/24$–$22/24$ from the lower end of the fuel active length. The Gd fuel rod G is loaded with uranium fuel of 4.4 wt % and gadolinia of 7.5 wt % in the range of $1/24$–$22/24$ from the lower end of the fuel active length. The Gd fuel rod F is loaded with uranium fuel of 4.4 wt % and gadolinia of 7.5 wt % in the range of $1/24$–$8/24$ and uranium fuel of 4.4 wt % in a range of $8/24$–$15/24$ from the lower end of the fuel active length. The short-length fuel rod E is loaded with uranium fuel of 4.9 wt % in the range of $1/24$–$15/24$ from the lower end of the fuel active length.

By a combination of the fuel rods shown in FIG. 3, the high enrichment fuel 9 makes an average enrichment of a cross section perpendicular to the axial direction about 4.59 wt % in the range of $1/24$–$15/24$ and makes the average enrichment of the cross section about 4.56 wt % in the range of $15/24$–$22/24$ from the lower end of the fuel active length.

On the other hand, the low enrichment fuel assembly 7 of FIG. 2 is loaded with no gadolinia and the natural uranium in both the lower end region and the upper end region. The average enrichment of the low enrichment fuel assembly 7 is lower than that of the high enrichment fuel assemblies 8 and 9.

Figure 17:
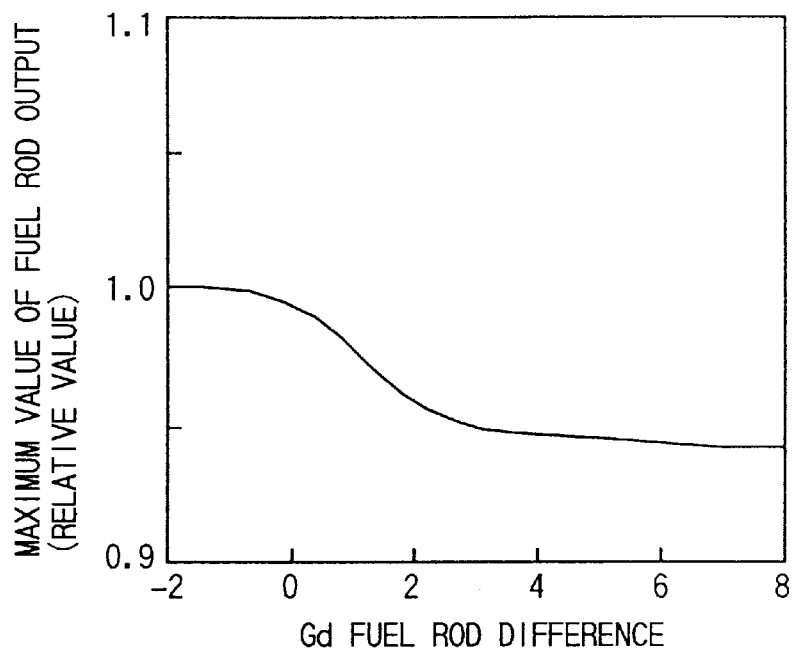
FIG. 17 is a graph of the relationship between the Gd fuel rod difference and local peaking factor.
Figure 18:
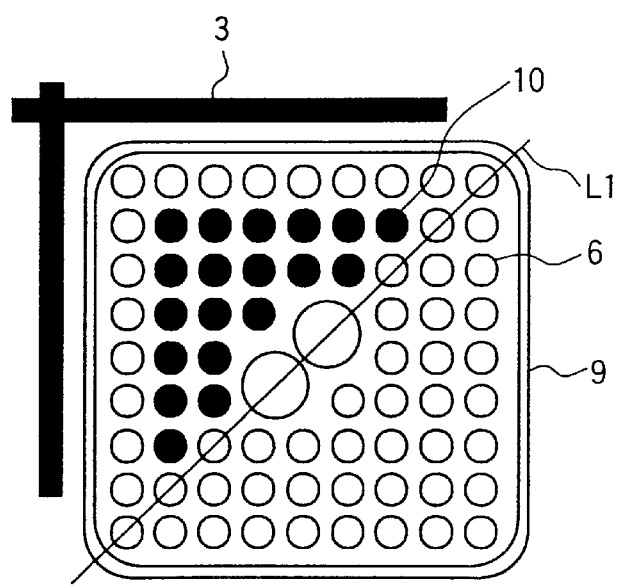
FIG. 18 is a diagram of the upper limit of the Gd fuel rod difference.

According to this example, as shown in FIG. 17, by making the Gd fuel rod difference of the high enrichment fuel assembly 9 six so as to be larger than two, the thermal margin can be sufficiently secured because an increase of the local peaking factor on the control rod side can be suppressed even if the control rod 3 of the second control cell 2b is extracted after the second operation cycle.

Especially, by arranging the Gd fuel rod 10 in the corner of the second layer from the outside on the control rod side of the high enrichment fuel assembly 9, the local peaking factor of the corner on the control rod side can be effectively suppressed. Furthermore, the channel peaking factor in the core can be reduced because the loading pattern of the fuel assembly in the central area of the core, which has a relatively high output, is almost non-uniform. This also contributes to a securing of the thermal margin.

As the high enrichment fuel assembly 8 of this example, an uranium fuel assembly only containing uranium fuel (hereinafter called "uranium fuel") or a MOX fuel assembly containing plutonium fuel (hereinafter called "MOX fuel") can be used. Furthermore, the uranium fuel and the MOX fuel can be used for the two high enrichment fuel assemblies 8. In this case, the average enrichment of both uranium and plutonium has only to be higher than that of the low enrichment fuel assembly 7.

Figure 9:
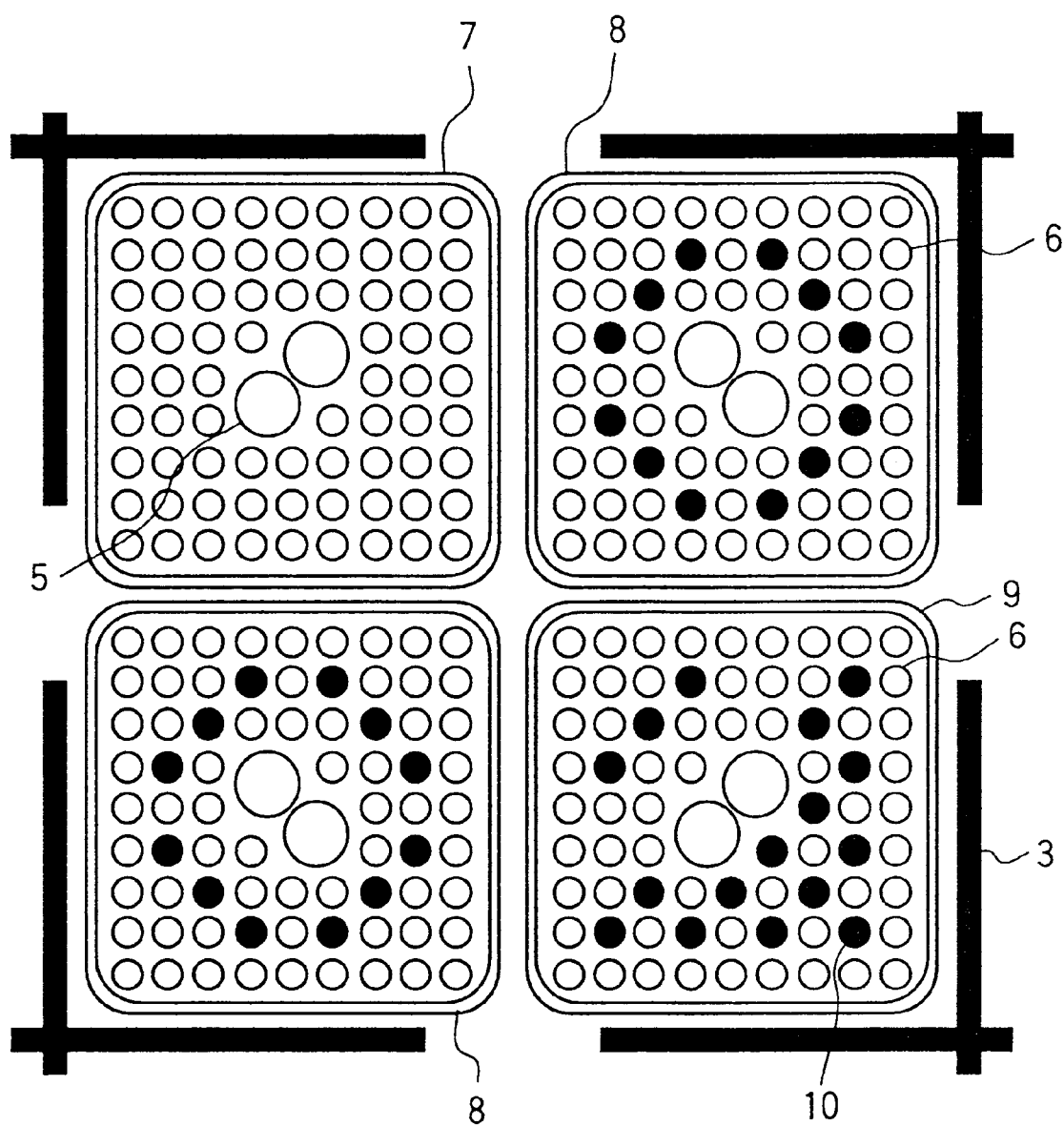
FIG. 9 is a cross sectional view of a second example of a unit loading pattern according to the present invention.

Next, a second example of a unit loading pattern according to the present invention will be explained by reference to FIG. 9. FIG. 9 shows a cross sectional view of this second example. The number of the Gd fuel rods 10 in the high enrichment fuel assembly 9 constituting this unit loading pattern is 16. Eleven Gd fuel rods 10 are arranged in the control rod side area and five Gd fuel rods 10 are arranged in the anticontrol rod side area. The Gd fuel rod difference between these two areas is 6. The number of the Gd fuel rods 10 in each of the high enrichment fuel assemblies 8 is 12. Six Gd fuel rods 10 are arranged in the control rod side area and six Gd fuel rods 10 are arranged in the anticontrol rod side area.

In this example, by making the Gd fuel rod difference of the high enrichment fuel assembly 9 six so as to be larger than two, the increase in the local peaking factor on the control rod side can be suppressed and the thermal margin can be sufficiently secured similar to the first example of FIG. 2, even if the control rod 3 of the second control cell 2b is extracted after the second operation cycle.

Like the first example and the second example, whether the Gd fuel rod difference of the high enrichment fuel assemblies 8 in the unit loading pattern is large or small, by making the Gd fuel rod difference of the high enrichment fuel 9 two or more, the increase of the local peaking factor by the control rod history effect can be suppressed.

Figure 10:
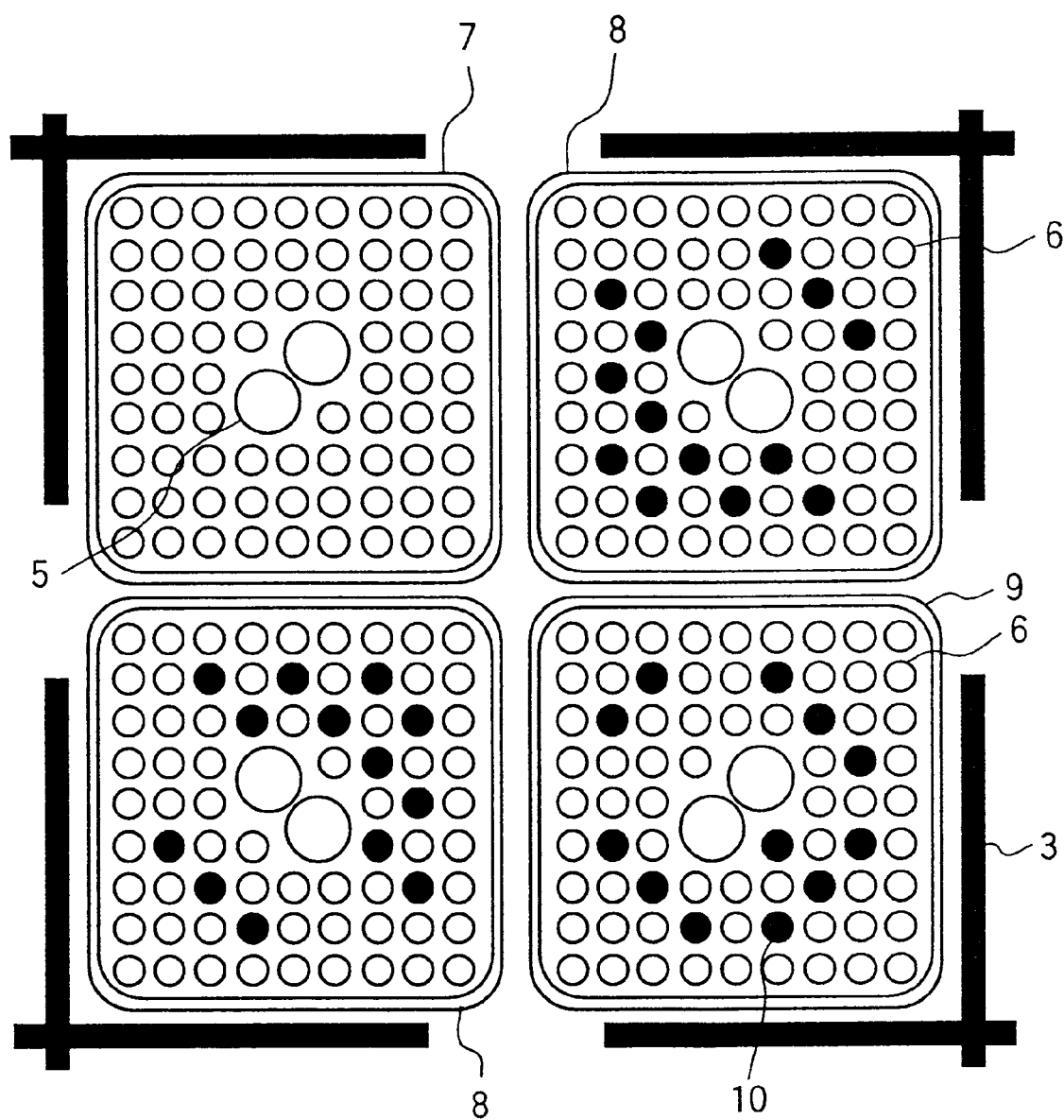
FIG. 10 is a cross sectional view of a third example of a unit loading pattern according to the present invention.

Next, a third example of a unit loading pattern according to the present invention will be explained with reference to FIG. 10. FIG. 10 shows a cross sectional view of this third example. The number of the Gd fuel rods 10 in the high enrichment fuel assembly 9 constituting this unit loading pattern is 12. Seven Gd fuel rods 10 are arranged in the control rod side area and five Gd fuel rods 10 are arranged in the anticontrol rod side area. The Gd fuel rod difference between these two areas is 2. The number of the Gd fuel rods 10 in the high enrichment fuel assemblies 8 is 13. Three Gd fuel rods 10 are arranged in the control rod side area and ten Gd fuel rods 10 are arranged in the anticontrol rod side area.

In this example, by making the Gd fuel rod difference of the high enrichment fuel assembly 9 equal to two, the increase of the local peaking factor on the control rod side can be suppressed and the thermal margin can be sufficiently secured similar to the first example of FIG. 2, even if the control rod 3 of the second control cell 2b is extracted after the second operation cycle.

Figure 11:
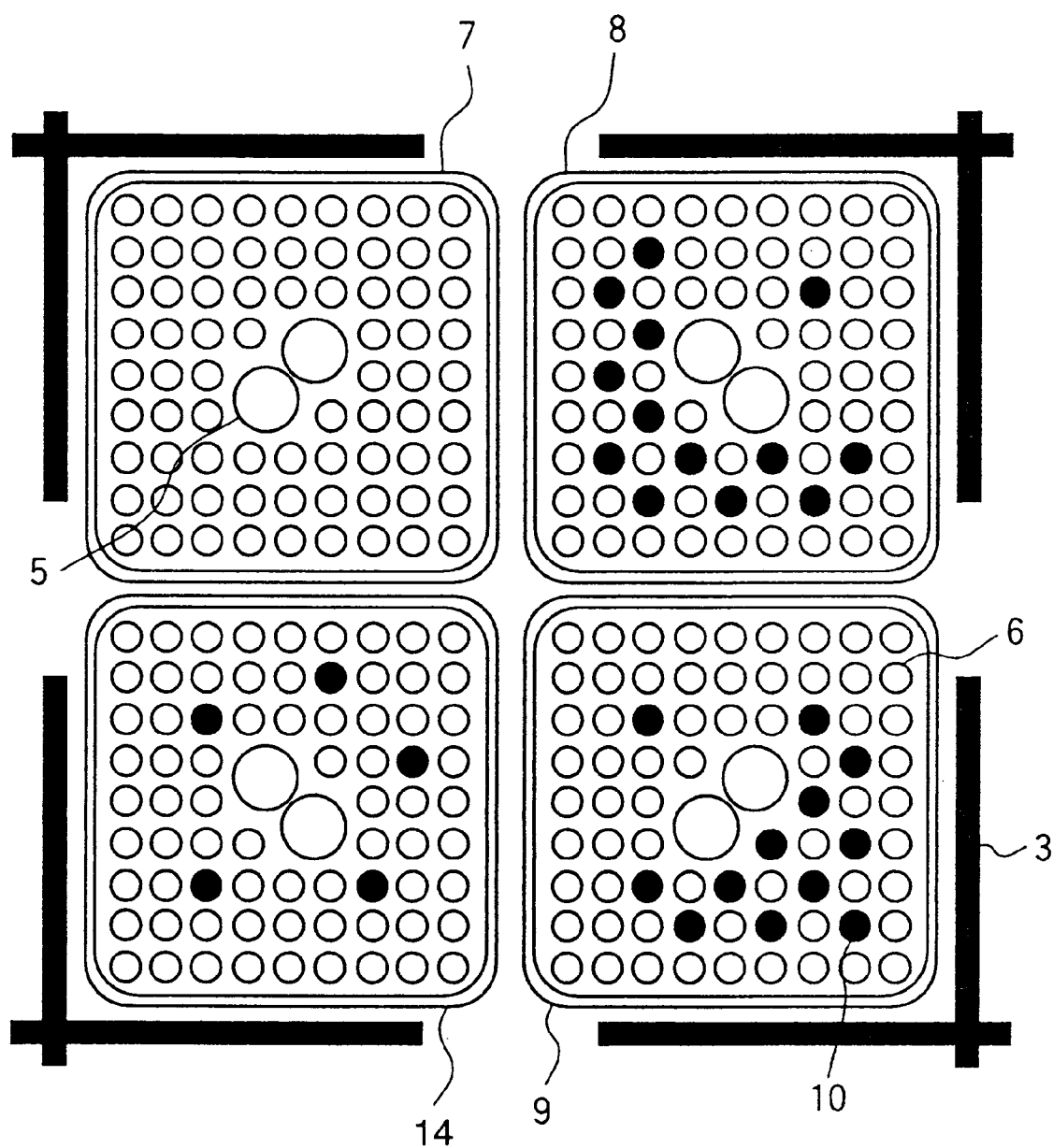
FIG. 11 is a cross sectional view of a fourth example of a unit loading pattern according to the present invention.

Next, a fourth example of a unit loading pattern according to the present invention will be explained with reference to FIG. 11. FIG. 11 shows a cross sectional view of this fourth example. In this example, the low enrichment fuel assembly 7, the high enrichment fuel assemblies 8 and 9, and a middle enrichment fuel assembly 14 are used. The average enrichment of the middle enrichment fuel assembly 14 is lower than that of the high enrichment fuel assemblies 8 and 9, and is higher than that of low enrichment fuel assembly 7.

The number of the Gd fuel rods 10 in the high enrichment fuel assembly 9 is 12. Ten Gd fuel rods 10 are arranged in the control rod side area and two Gd fuel rods 10 are arranged in the anticontrol rod side area. The Gd fuel rod difference between these two areas is 8. The number of the Gd fuel rods 10 in the high enrichment fuel assembly 8 is 13. Three Gd fuel rods 10 are arranged in the control rod side area and ten Gd fuel rods 10 are arranged in the anticontrol rod side area. The number of the Gd fuel rods 10 in the middle enrichment fuel assembly 14 is 5. Two Gd fuel rods 10 are arranged in the control rod side area and three Gd fuel rods 10 are arranged in the anticontrol rod side area.

Even when the middle enrichment fuel assembly 14 is provided in the unit loading pattern like this example, by making the Gd fuel rod difference of the high enrichment fuel assembly 9 eight so as to be larger than two, the increase of the local peaking factor on the control rod side can be suppressed and the thermal margin can be sufficiently secured similar to the first example of FIG. 2, even if the control rod 3 of the second control cell 2b is extracted after the second operation cycle.

Figure 12:
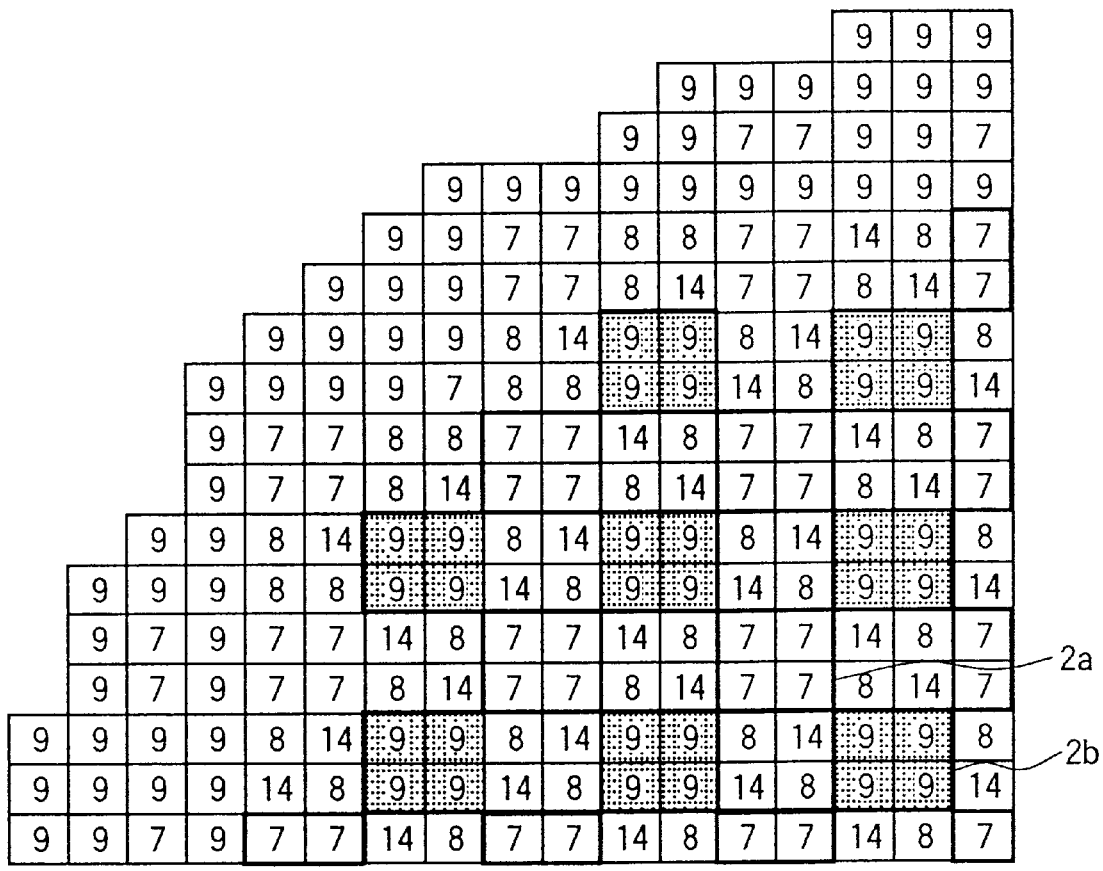
FIG. 12 is a cross sectional diagram showing one-fourth of a second example of an initial core according to the present invention.
Figure 12:
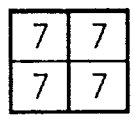
Figure 12:
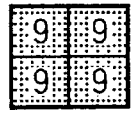
Figure 12:
Figure 12:
Figure 12:
Figure 12:

FIG. 12 is a cross sectional diagram showing one-fourth of the second example of an initial core according to the present invention in which the unit loading pattern of FIG. 11 is arranged in the central area of the core. In this core, the first control cell 2a, the second control cell 2b, the low enrichment fuel 7 and the high enrichment fuel assembly 9 are the same as the first example of FIG. 1. A difference from the first example is that part of the high enrichment fuel assemblies 8 are replaced with the middle enrichment fuel assemblies 14, such that 172 high enrichment fuel assemblies 8 and 132 middle enrichment fuel assemblies 14 are loaded into the central area of the core.

Figure 13:
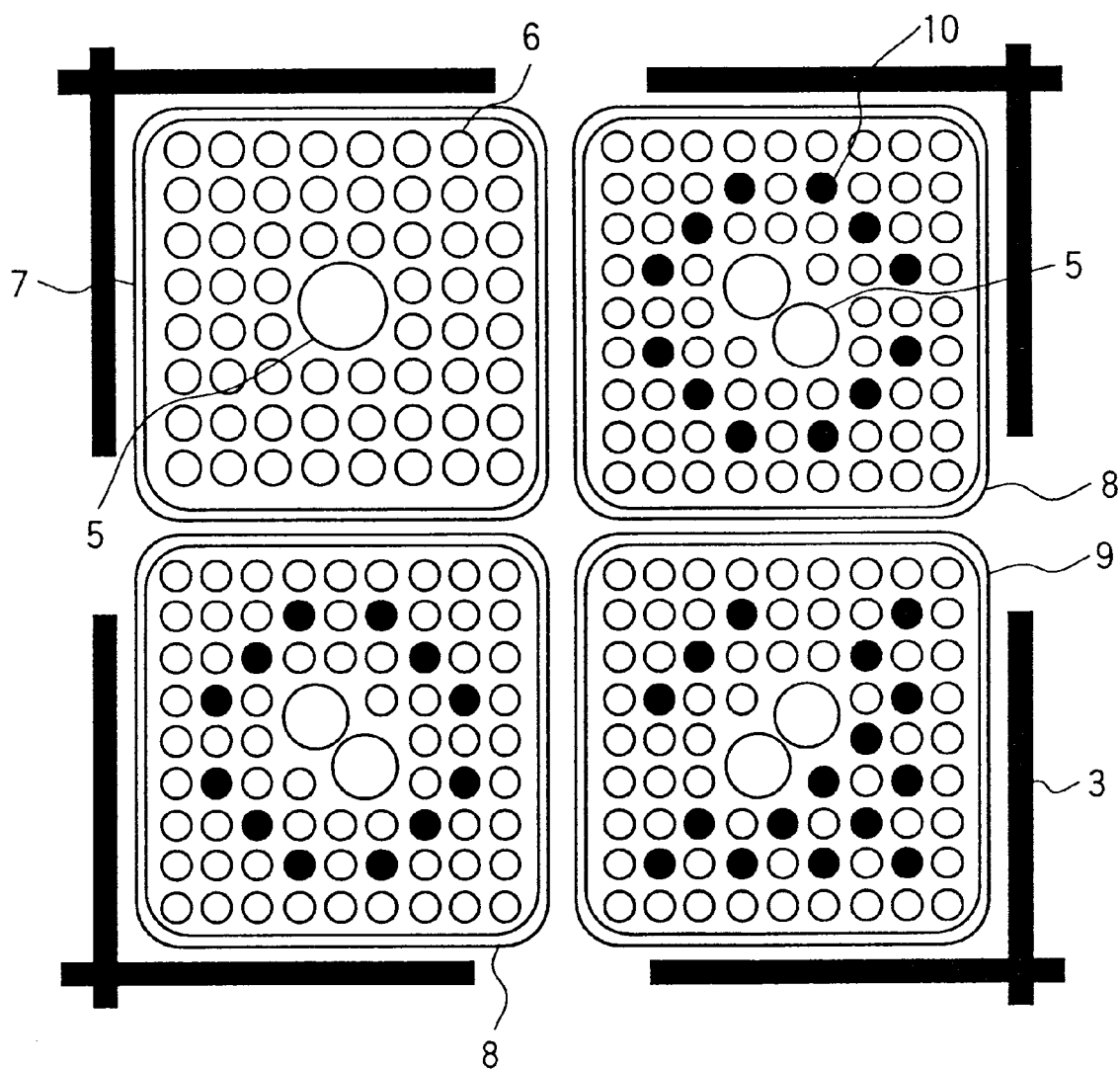
FIG. 13 is a cross sectional view of a fifth example of a unit loading pattern according to the present invention.

Next, a fifth example of a unit loading pattern according to the present invention will be explained with reference to FIG. 13. FIG. 13 shows a cross sectional view of this fifth example. Three high enrichment fuel assemblies 8 and 9 of the four fuel assemblies constituting the unit loading pattern of this example are the same as the second example of FIG. 9, and the low enrichment fuel assembly 7 is different from the second example. The low enrichment fuel assembly 7 of this example has fuel rods 6 arranged in a square lattice-form of 8 columns and 8 rows (8×8) and one large-diameter water rod 5 arranged in an area in which four fuel rods can be arranged.

In this example, by making the Gd fuel rod difference of the high enrichment fuel assembly 9 six so as to be larger than two, the increase in the local peaking factor on the control rod side can be suppressed and the thermal margin can be sufficiently secured similar to the second example of FIG. 9, even if the control rod 3 of the second control cell 2b is extracted after the second operation cycle.

Even if the unit loading pattern is composed of fuel assemblies which have a different configuration like this example, by making the Gd fuel rod difference of the high enrichment fuel assembly 9 two or more, the increase of the local peaking factor by the control rod history effect can be suppressed.

Figure 14:
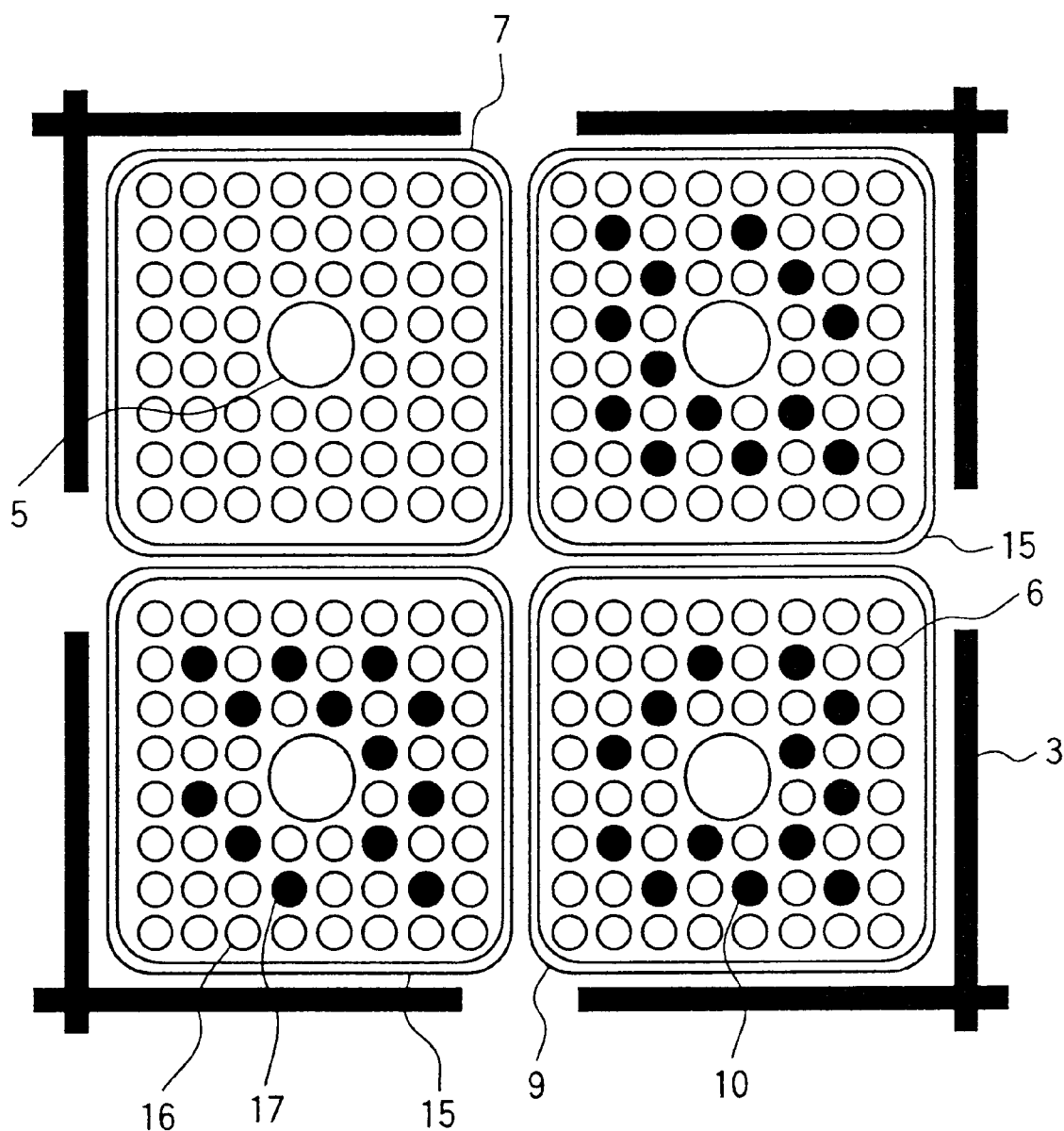
FIG. 14 is a cross sectional view of a sixth example of a unit loading pattern according to the present invention.

Next, a sixth example of a unit loading pattern according to the present invention will be explained with reference to FIG. 14. FIG. 14 shows a cross sectional view of this sixth example. Four fuel assemblies constituting the unit loading pattern of this example have the same shape as the low enrichment fuel assembly 7 shown in FIG. 13. In FIG. 14, the MOX fuel assembly 15 contains plutonium from the time of being initially loaded in the core. The MOX fuel assembly 15 has a fuel rod 16 containing no gadolinia and a Gd fuel rod 17 containing gadolinia. Part of the fuel rods 16 and part of the Gd fuel rods 17 contain plutonium. Of course, it is possible that the Gd fuel rods 17 contain no plutonium.

The number of the Gd fuel rods 10 in the high enrichment fuel assembly 9 is 13. Eight Gd fuel rods 10 are arranged in the control rod side area and five Gd fuel rods 10 are arranged in the anticontrol rod side area. The Gd fuel rod difference between these two areas is 3. The number of the Gd fuel rods 17 in the MOX fuel assembly 15 is 13. Five Gd fuel rods 10 are arranged in the control rod side area and eight Gd fuel rods 10 are arranged in the anticontrol rod side area.

In case the shape of the fuel assembly changes, as in this example, at least by making the Gd fuel rod difference of the high enrichment fuel assembly 9 two or more, the increase of the local peaking factor on the control rod side can be suppressed and the thermal margin can be sufficiently secured, even if the control rod 3 of the second control cell 2b is extracted after the second operation cycle.

In this example, two MOX fuel assemblies 15 containing plutonium are arranged to adjoin each other obliquely, and the low enrichment fuel assembly 7 and the high enrichment fuel assembly 9 are arranged to adjoin each other obliquely. But, it is possible to replace one of the MOX fuel assemblies 15 with a high enrichment fuel assembly 8.

Figure 15:
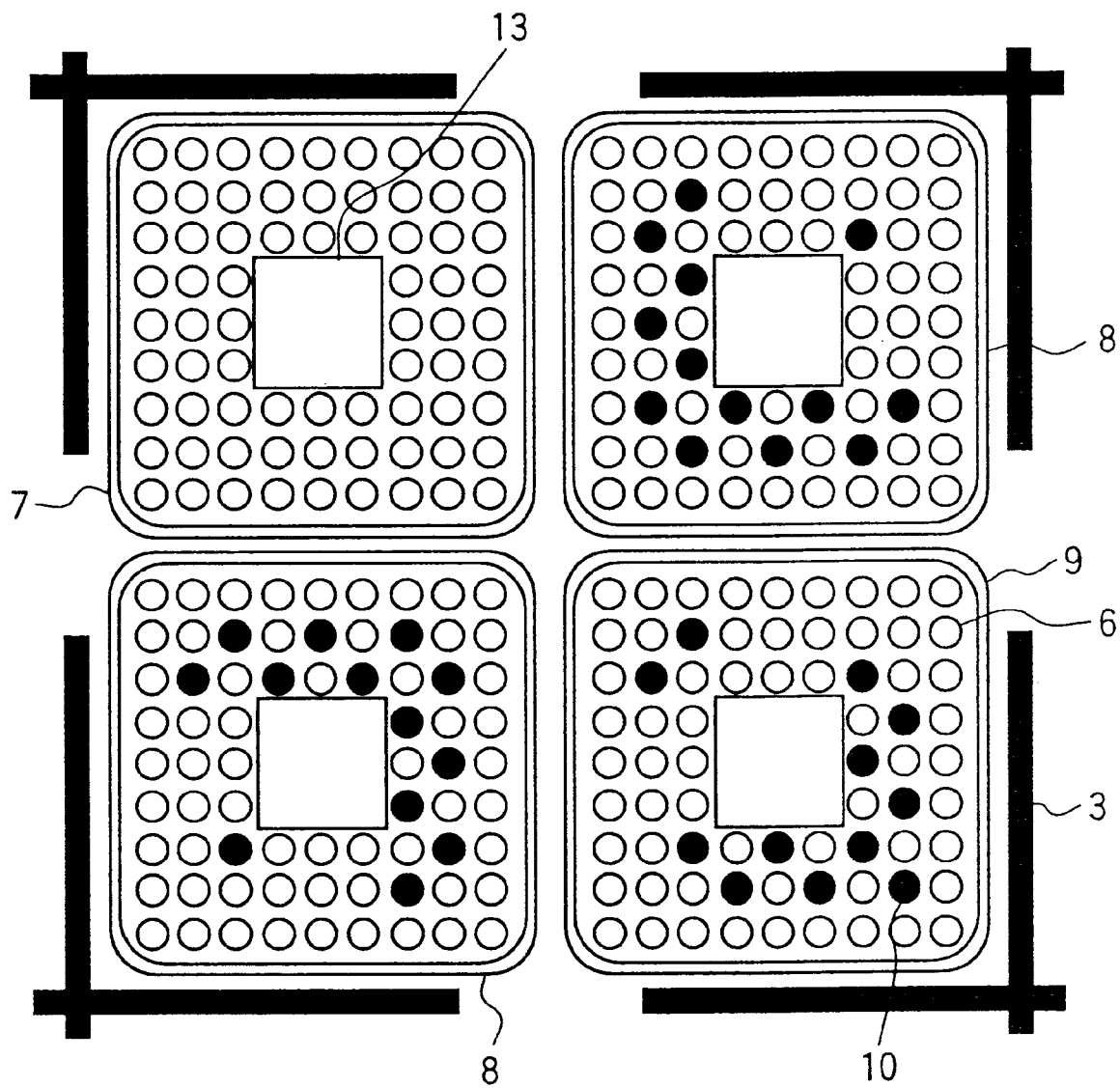
FIG. 15 is a cross sectional view of a seventh example of a unit loading pattern according to the present invention.

Next, a seventh example of a unit loading pattern according to the present invention will be explained with reference to FIG. 15. FIG. 15 shows a cross sectional view of this seventh example. Four fuel assemblies constituting the unit loading pattern of this example have fuel rods arranged in a square lattice-form of 9×9 like the first example of FIG. 2 and one water box 13. The water box 13 occupies an area in which 9 fuel rods can be arranged. The number of the fuel rods in the fuel assembly is 72.

The number of the Gd fuel rods 10 in the high enrichment fuel assembly 9 of this example is 12. Nine Gd fuel rods 10 are arranged in the control rod side area and three Gd fuel rods 10 are arranged in the anticontrol rod side area. The Gd fuel rod difference between these two areas is 6. The number of the Gd fuel rods 10 in the high enrichment fuel assembly 8 is 13. Ten Gd fuel rods 10 are arranged in the control rod side area and three Gd fuel rods 10 are arranged in the anticontrol rod side area.

In this example, by making the Gd fuel rod difference of the high enrichment fuel assembly 9 six so as to be larger than two, the increase of the local peaking factor on the control rod side can be suppressed and the thermal margin can be sufficiently secured similar to the first example of FIG. 2, even if the control rod 3 of the second control cell 2b is extracted after the second operation cycle.

Figure 16:
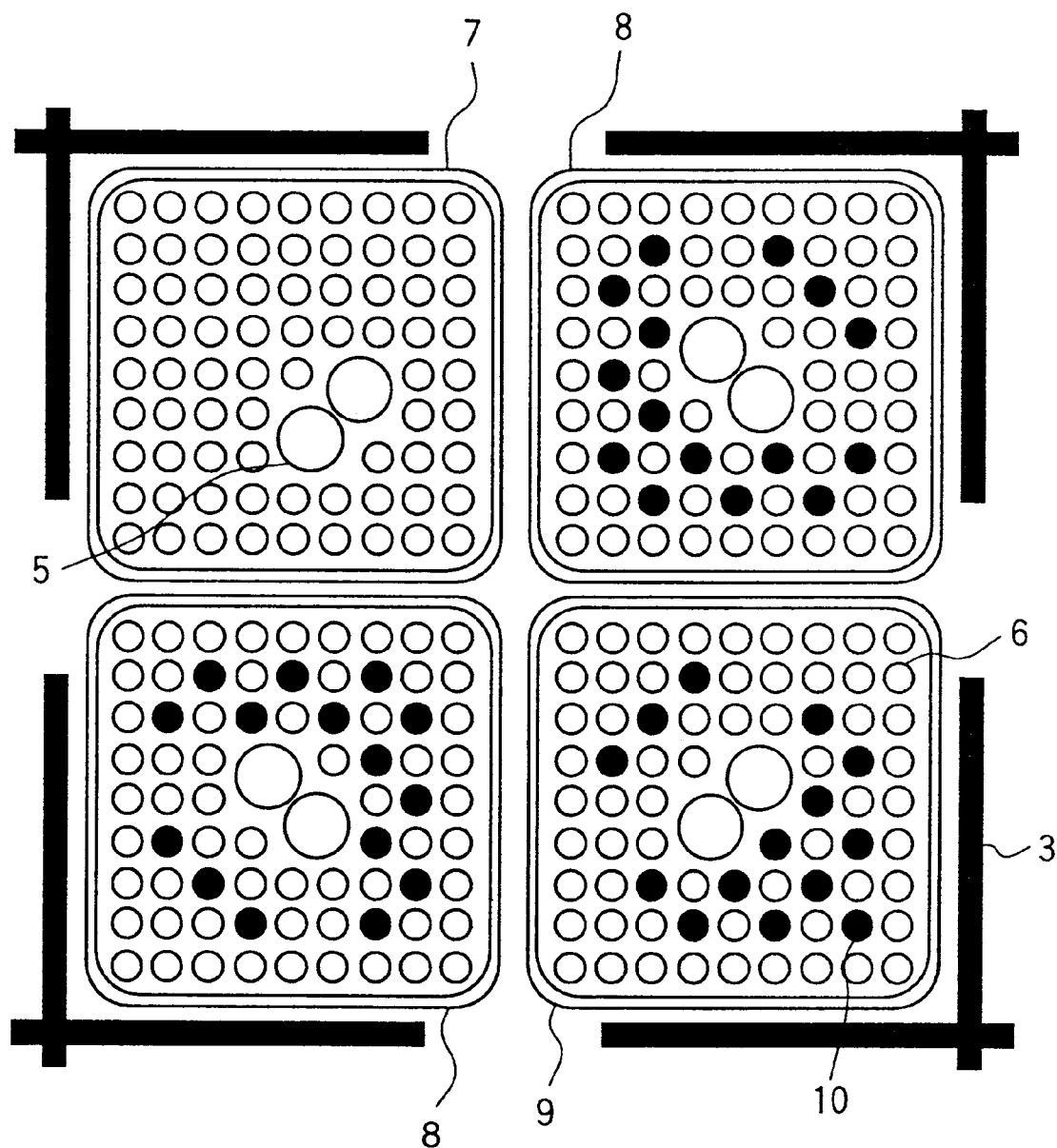
FIG. 16 is a cross sectional view of an eighth example of a unit loading pattern according to the present invention.

Next, an eighth example of a unit loading pattern according to the present invention will be explained with reference to FIG. 16. FIG. 16 shows a cross sectional view of this eighth example. The high enrichment fuel assemblies 8 and 9 constituting the unit loading pattern of this example are the same as those in the first example of FIG. 2 and the low enrichment fuel assembly 7 is different. The low enrichment fuel assembly 7 has the water rods 5 shifted in position from the center of the fuel assembly.

In case the water rods are shifted from the center of the fuel assembly as in this example, by making the Gd fuel rod difference of the high enrichment fuel assembly 9 two or more, the increase of the local peaking factor on the control rod side can be suppressed and the thermal margin can be sufficiently secured, even if the control rod 3 of the second control cell 2b is extracted after the second operation cycle.

What is claimed is:

1. An initial core comprising a plurality of fuel assemblies having different average enrichment and a plurality of control rods, each fuel assembly having a square-shaped cross section and each control rod having a cross-shaped cross section,
    wherein a unit cell of a square-form is composed of one first fuel assembly with the lowest average enrichment and three second fuel assemblies with higher average enrichment than the first fuel assembly,
    a plurality of unit loading patterns arranged in a central area of the initial core, each unit loading pattern being composed of one unit cell and four control rods arranged at four corners of said one unit cell,
    the second fuel assembly obliquely adjoining the first fuel assembly in each unit loading pattern is divided into one side area near to the control rod and another side area far from the control rod by a diagonal line, a number of fuel rods containing gadolinia in said one side area being 2 or more than the number of fuel rods containing gadolinia in said another side area of the second fuel assembly obliquely adjoining the first fuel assembly.

2. An initial core claimed in claim 1, wherein said unit loading patterns are arranged to constitute control cells of a square-form, each control cell being composed of four fuel assembles said second fuel assemblies obliquely adjoining the first fuel assembly adjoined each other.

3. An initial core claimed in claim 1 or 2, wherein 9 difference of the number of fuel rods containing gadolinia in said one side area and that in said another side area is in the range of between 3 and 19.

4. An initial core claimed in any one of claims 1 or 2, wherein said second fuel assembly obliquely adjoining the first fuel assembly in each unit loading pattern has a fuel rod containing gadolinia at the corner of the second layer from the outermost periphery in said one side area.

5. An initial core claimed in any one of claims 1 or 2, wherein at least one of two second fuel assemblies except for said second fuel assembly obliquely adjoining the first fuel assembly in each unit loading pattern contains plutonium.

6. An initial core claimed in any one of claims 1 or 2, wherein at least the second fuel assembly has fuel rods arranged in the lattice-pattern of 9 columns and 9 rows and two large-diameter water rods arranged in an area of a size to arrange seven fuel rods.

7. An initial core claimed in any one of claims 1 or 2, wherein at least the second fuel assembly has fuel rods arranged in the lattice-pattern of 9 columns and 9 rows and one water box arranged in an area of a size to arrange nine fuel rods.

8. An initial core comprising a plurality of first fuel assemblies containing plutonium, a plurality of second fuel assemblies containing no plutonium and a plurality of control rods, each fuel assembly having a square-shaped cross section and each control rod having a cross-shaped cross section,
    wherein a unit cell of a square-form is composed of two first fuel assemblies and two second fuel assemblies, said two first fuel assemblies obliquely adjoining each other,
    a plurality of unit loading patterns arranged in a central area of the initial core, each unit loading pattern being composed of one unit cell and four control rods arranged at four corners of said one unit cell,
    one of the second fuel assemblies, which has a higher average enrichment than that of the other of the second fuel assemblies in each unit loading pattern, is divided into one side area near to the control rod and another side area far from the control rod by a diagonal line, a number of fuel rods containing gadolinia in said one side area being 2 or more than the number of fuel rods containing gadolinia in said another side area of the one of the second fuel assemblies which has a higher average enrichment than that of the other of the second fuel assemblies in each unit loading pattern.

9. An initial core claimed in claim 8, wherein said unit loading patterns are arranged to constitute control cells of a square-form, each control cell being composed of four fuel assemblies, said second fuel assemblies having a higher average enrichment being adjoined with each other.

* * * * *